(12) United States Patent
Aronovich et al.

(10) Patent No.: US 8,918,605 B2
(45) Date of Patent: Dec. 23, 2014

(54) CAPACITY MANAGEMENT IN DEDUPLICATION STORAGE SYSTEMS

(75) Inventors: Lior Aronovich, Toronto (CA); Shira Ben-Dor, Givat Shmuel (IL); Aviv Caro, Modiin (IL); Elena Drobchenko, Raanana (IL); Samuel Krikler, Herzelia (IL); Ofer Leneman, Kfar Saba (IL); Asaf Levy, Rishon Le Zion (IL); Liran Loya, Hod-Hasharon (IL); Dan Melamed, Tel Aviv (IL); Tzafrir Z. Taub, Givaataim (IL)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 13/488,171

(22) Filed: Jun. 4, 2012

(65) Prior Publication Data

US 2012/0246438 A1 Sep. 27, 2012

Related U.S. Application Data (63) Continuation of application No. 12/958,202, filed on Dec. 1, 2010, now Pat. No. 8,533,407.

(51) Int. Cl.
| | |
|---|---|
| *G06F 12/10* | (2006.01) |
| *G06F 11/34* | (2006.01) |
| *G06F 3/06* | (2006.01) |
| *G06F 11/14* | (2006.01) |

(52) U.S. Cl.
CPC ........ *G06F 11/3433* (2013.01); *G06F 11/3485* (2013.01); *G06F 3/0605* (2013.01); *G06F 3/0608* (2013.01); *G06F 3/0641* (2013.01); *G06F 3/0644* (2013.01); *G06F 3/0653* (2013.01); *G06F 3/067* (2013.01); *G06F 11/1453* (2013.01)
USPC ............ 711/161; 711/154; 711/162; 711/165

(58) Field of Classification Search
CPC ................................ G06F 3/067; G06F 3/065
USPC .................................. 711/161, 162, 165, 154
See application file for complete search history.

(56) References Cited

U.S. PATENT DOCUMENTS

| | | | |
|---|---|---|---|
| 5,631,941 | A | 5/1997 | Shou et al. |
| 7,472,238 | B1 | 12/2008 | Gokhale et al. |
| 7,519,635 | B1 | 4/2009 | Haustein et al. |
| 7,539,710 | B1 | 5/2009 | Haustein et al. |
| 7,747,927 | B2 | 6/2010 | Guterman et al. |
| 7,764,081 | B1 | 7/2010 | Tuan et al. |
| 8,285,690 | B2 * | 10/2012 | Nakamura et al. ............ 707/692 |
| 2001/0007119 | A1 | 7/2001 | Katayama et al. |

(Continued)

OTHER PUBLICATIONS

IBM, "System, Method, and Service for Automated Capacity Expansion of a Data Deduplication Repository," www.IP.com, IPCOM000184411D, Jun. 23, 2009, 6 pages.

(Continued)

*Primary Examiner* — Jae Yu
(74) *Attorney, Agent, or Firm* — Griffiths & Seaton PLLC (57) ABSTRACT

A deduplication storage capacity is estimated as a function of an expected deduplication ratio, the expected deduplication ratio being a combined average of a current deduplication ratio and a configured deduplication ratio, the current deduplication ratio depending on the data currently stored in the deduplication storage, and the configured deduplication ratio being an estimate made at a configuration stage of the deduplication computing storage environment.

8 Claims, 3 Drawing Sheets

(56) References Cited

U.S. PATENT DOCUMENTS

| | | |
|---|---|---|
| 2002/0118306 A1 | 8/2002 | Lee |
| 2008/0133561 A1 | 6/2008 | Dubnicki et al. |
| 2009/0063795 A1 | 3/2009 | Yueh |
| 2009/0193219 A1 | 7/2009 | Ohira et al. |
| 2009/0234795 A1 | 9/2009 | Haas et al. |
| 2009/0276454 A1 | 11/2009 | Smith |
| 2010/0042790 A1 | 2/2010 | Mondal et al. |
| 2010/0250501 A1 | 9/2010 | Mandagere et al. |
| 2010/0250896 A1 | 9/2010 | Matze |

OTHER PUBLICATIONS

Guanlin Lu et al., "Frequncy Based Chunking for Data De-Duplicaton," IEEE, 1526-7539/10, 2010, pp. 287-296.

Yujuan Tan et al., "DAM: A DataOwndership-Aware Multi-Layered De-duplication Scheme," IEEE, 978-0/7695-4134-1/10, 2010, pp. 403-411.

Tianming Yang et al., "DEBAR: A Scalable High-Performance De-duplication Storage System for Backkup and Archiving," IEEE, 978-1-4244-6443-2/10, 2010, 12 pages.

\* cited by examiner

CAPACITY MANAGEMENT IN DEDUPLICATION STORAGE SYSTEMS

CROSS-REFERENCE TO RELATED APPLICATIONS

This application is a Continuation of U.S. patent application Ser. No. 12/958,202, filed on Dec. 1, 2010.

FIELD OF THE INVENTION

The present invention relates in general to computers, and more particularly to apparatus, method and computer program product embodiments for capacity management in deduplication storage systems.

DESCRIPTION OF THE RELATED ART

Data deduplication refers to the reduction and/or elimination of redundant data. In a data deduplication process, duplicate copies of data are reduced or eliminated, leaving a minimal amount of redundant copies, or a single copy of the data, respectively. Using deduplication processes provides a variety of benefits, such as reduction of required storage capacity and reduction of network bandwidth. Due to these and other benefits, deduplication has emerged in recent years as a highly important technological field in computing storage systems. Challenges to providing deduplication functionality include aspects such as efficiently finding duplicated data patterns in typically large storage repositories, and storing the data patterns in a deduplicated storage-efficient form.

SUMMARY OF THE INVENTION

A significant challenge in deduplication storage systems is the requirement to compute and report their capacity. Although reporting capacity in terms of physical storage is possible, in a user's perspective this may not be sufficient to accurately describe the actual system capacity. The reason for this is that the actual system capacity, in the user's perspective, depends, in addition to physical storage, also on the deduplication ratio. For example, for a storage system whose physical capacity is 1 terabyte, where the deduplication ratio of the data streamed into the system is 1:5 (i.e. only ⅕ of the data is unique and the rest is duplicated data), the actual system capacity in the user's perspective is 5 terabytes.

The challenge in accurate capacity reporting stems from the fact that the deduplication ratio depends both on the specific data stored within the deduplication storage system at any given time, and on the data that is yet to be streamed into the storage system. The deduplication ratio is therefore dynamic over time.

Moreover, it may be required to partition the total capacity of a deduplication storage system into portions. For example, a user may require to partition the total storage capacity into portions corresponding to different data types or data sources. In doing so it is generally required that the storage capacity of the defined portions corresponds and fluctuates with the effects of the changing deduplication ratio on the system capacity. A mechanism that allows for definition of such partitioning of a deduplication storage, and enables the partitioning to fluctuate and change in a sensible manner in accordance with the effects of the changing deduplication ratio is required.

Existing approaches for partitioning of deduplication storage systems are mainly based on defining portions of the physical storage. With such approaches the portions defined are generally physical entities, rather than logical entities, thus frequently reducing the flexibility by which user data associated with a portion is stored in the physical storage. When user data is streamed into a deduplication storage system, parts of the data that are not found in the system are written to the physical storage, and parts that are found are recorded generally as references. When user data is streamed into a defined portion of the physical storage, the data written to the physical storage can be associated with the consumed size of that portion. However, there is difficulty in associating the references with any of the physical portions. If references are considered in the consumed storage calculation, then the calculations of both the consumed storage and the capacity of the storage are no longer physical. On the other hand if references are disregarded in the consumed storage calculation, then storage capacity may be lost when user data is deleted. In addition, with physical partitioning, when adding or deleting user data from the storage system, identifying the other portions affected by these operations may entail a system scan, which is expensive in runtime. Essentially, defining physical partitioning practically disregards the effects of the deduplication ratio on the partitioning as well as on the entire storage system, while these effects are highly significant in enabling coherent and understandable behavior of the partitioning.

In view of the foregoing, a need exists for a mechanism for providing effective capacity management that serves to address the challenges described previously. Accordingly, various embodiments for capacity management in a deduplication computing storage environment by a processor device are provided. In one embodiment, by way of example only, a deduplication storage capacity is estimated as a function of an expected deduplication ratio, the expected deduplication ratio being a combined average of a current deduplication ratio and a configured deduplication ratio, the current deduplication ratio depending on the data currently stored in the deduplication storage, and the configured deduplication ratio being an estimate made at a configuration stage of the deduplication computing storage environment.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Throughout the following description and claimed subject matter, a physical capacity of a deduplication storage system may be intended to refer to the total physical capacity available for storing user data. A nominal capacity of a deduplication storage system may be intended to refer to the product of the physical capacity multiplied by the expected deduplication ratio (which will be defined in the following).

One aspect of the illustrated embodiments, following, concerns computing and reporting the capacity of a deduplication storage system based on nominal sizing (rather than physical sizing). This applies to both the aspects of storage capacity and the consumed storage. This also applies to the system as a whole, as well as to its user-defined portions.

In one aspect of the illustrated embodiments, the capacity of a deduplication storage system is computed based on an expected deduplication ratio. This ratio is computed based on a current deduplication ratio, which depends on the data currently stored in the system, and on a configured deduplication ratio, which is based on user estimation and is assigned by the user upon configuration. Both of the latter ratios may be specified and computed per data type defined by the user, thus producing an expected deduplication ratio per data type.

The current and the configured deduplication ratios are averaged, to produce the expected deduplication ratio, according to weights, where the weight of the current deduplication ratio is higher relative to that of the configured deduplication ratio, as the system is more mature in terms of the data it has processed (more details on that in the following). The consumed size of the storage system is reported, similar to the system capacity, in nominal terms, as the difference between the nominal size of the data streamed into the system and the size of the data deleted from the system.

In an additional aspect of the illustrated embodiments, the total capacity of a deduplication storage system may be partitioned into storage units (SUs), which are logical units sharing all the physical storage. Each SU is assigned by the user with a proportion of the computed nominal size of the storage system. Computing capacity values of the SUs includes computing the current capacity of the storage system, and then computing the current capacities of the SUs, based on their assigned proportions. The consumed storage size of each SU is computed as the difference between the nominal size of the data streamed into that SU and the size of the data deleted from that SU.

Computing the capacity of the storage system and its SUs using the mechanisms of the illustrated embodiments ensures that the computed and reported total capacity of the storage system, total capacity of its SUs, as well as the capacity of each individual SU, all correspond and fluctuate in accordance with the effects of the expected deduplication ratio on the capacity of the storage system. Specifically, if the nominal capacity of the storage system increases, based on an increase in the expected deduplication ratio, then the capacities of the storage system and its SUs increase accordingly.

Figure 1:
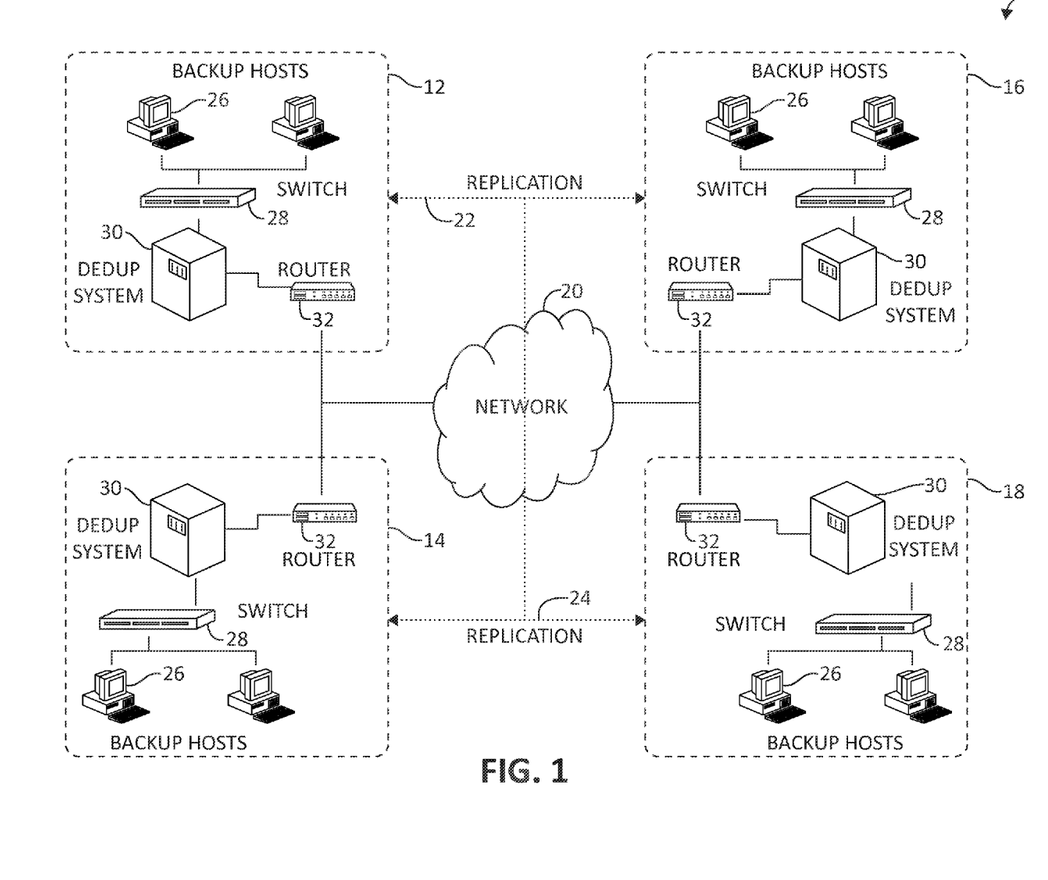
FIG. 1 illustrates an exemplary computing environment in which aspects of the present invention may be implemented.

Turning now to FIG. 1, exemplary architecture 10 of deduplication systems and related components in a computing storage environment, in which various aspects of the illustrated embodiments may be implemented, is depicted. Architecture 10 provides storage services to several backup hosts 26. Deduplicated data replication is provided between various deduplication system groups 12, 14, 16, and 18 as indicated by dashed lines 22 and 24. Each of groups 12, 14, 16, and 18 include one or more hosts 26, which are connected to a deduplication system 30 via networking components such as a switch 28 as indicated. Deduplication systems 30 are interconnected via networking components such as a router 32, which provides internetwork connectivity between groups 12, 14, 16, and 18. A network 20 connects such deduplication systems 30 and routers 32. Network 20 may, in one embodiment, include a wide area network (WAN). In other embodiments, network 20 may include local area networks (LANs), storage area networks (SANs), and other network topologies known to the skilled artisan. While routers 32 and switches 28 are shown, the skilled artisan will also appreciate that additional and/or substitute networking components are contemplated.

In one embodiment, switch 28 is compliant with a fibre channel network protocol, making the switch 28 and interconnected components capable of executing commands such as small computer systems interface (SCSI) commands. Such commands may be executed for a variety of storage devices, again as the skilled artisan will appreciate, such as disk drives, tape devices, solid state devices (SSDs), and the like. While the architecture 10 provides one example of components that may be utilized to implement various facets of the present invention and claimed subject matter, the skilled artisan will appreciate that other such architectures are contemplated.

In one aspect of the illustrated embodiments, and as previously mentioned, computing and reporting of the capacity of a deduplication storage system is based on nominal sizing (rather than physical sizing). This applies to both the aspects of storage capacity and the consumed storage. This also applies to the system as a whole as well as to its user defined portions.

Again, as stated previously, the capacity of a deduplication storage system may, in one aspect of the illustrated embodiments, be computed based on a formula taking into account the configured deduplication ratio assigned for the system upon configuration based on user estimation, and the current deduplication ratio computed based on the data currently stored in the system. Both ratios may be specified or computed per data type defined by the user.

In one aspect of the illustrated embodiments, the following formulae may be implemented:

System storage capacity=(physical storage capacity−physical storage consumed)×expected deduplication ratio+nominal size of the data currently stored in the system. [E1]

Expected deduplication ratio=$Wc$×configured deduplication ratio+$Wr$×current deduplication ratio, where $Wc+Wr=1$. [E2]

Current deduplication ratio=nominal size of the data currently stored in the system/physical storage consumed. [E3]

$Wr$=MAX(physical consumed storage/physical capacity, MIN(1, amount of data already streamed into the system/(physical storage capacity×configured deduplication ratio))) [E4]

The exemplary formula [E1] for system storage capacity includes two sections. The first section expresses the nominal capacity of the physical storage still unused (where the deduplication ratio is expected). The second section expresses the nominal capacity of the storage already consumed (where the deduplication ratio is already known).

The weights Wc and Wr in [E2] are defined to depend on the maturity of the system in terms of the data it has processed. Namely, as the system is more mature the weight of the current deduplication ratio increases relative to that of the configured deduplication ratio. In one aspect of the illustrated embodiments, the maturity of the system is expressed based on the physical consumed storage ratio of the system and on the amount of data already streamed into the system, using the formula [E4]. Note that although the physical consumed storage ratio may be small, the amount of data already streamed into the system may be large, indicating a mature repository. The nominal system capacity may be used based on the configured deduplication ratio, as an indication of the data size that the user generally intends to store in the system at steady state.

An alternative option of the illustrated embodiments for computing the expected deduplication ratio is averaging the values of the current deduplication ratio, sampling each predefined time interval, where the average is computed over the set of recent samples, and the size of this set is predefined. The weights may be higher for more recent samples. In one exemplary embodiment the predefined time interval is one hour, and the size of the recent samples set is 600.

The consumed size of the storage system may be reported, similar to the system capacity, in nominal terms. The nominal size of the data streamed into the system may be tracked, as well as the size of the data deleted from the system. Their difference, at any point in time, is the nominal consumed size in the system.

In one aspect of the illustrated embodiments, the total capacity of a deduplication storage system may be partitioned into storage units (SUs). In an exemplary deduplication storage system each storage unit is a logical unit. Further, all storage units share all the physical storage, and are striped across the physical storage. Each SU is assigned by the user with a proportion of the computed nominal size of the storage system. The total proportions of the SUs may equal or be lower or higher than 100%.

In one aspect of the illustrated embodiments, capacity values of the storage system and the SUs are computed only upon request to be reported, either externally or internally. Computing capacity values of the SUs includes computing the current capacity of the storage system, and then computing the current capacities of the SUs, based on their assigned proportions. Specifically, the formula for computing the capacity of a specific SU is the following:

$SU$ capacity=MAX(System storage capacity×$SU$ assigned proportion, $SU$ consumed size), where system storage capacity is computed according to [E1], and the $SU$ consumed size is computed as the difference between the nominal size of the data streamed into that SU and the size of the data deleted from that SU. [E5]

Computing the SUs' capacities using the mechanisms of the illustrated embodiments ensures that the total capacity of the SUs, as well as the capacity of each individual SU, correspond and fluctuate in accordance with the total capacity of the storage system as a function of the changes in the expected deduplication ratio. Specifically, if the nominal capacity of the storage system increases, based on an increase in the value of the expected deduplication ratio, then the total capacity of the SUs, as well as their individual capacities, increase accordingly.

Using [E5] for SU capacity may result in the total SUs capacity being larger than the total storage system capacity. This may be permissible in some storage systems, and may be impermissible in other storage systems. The following scenarios may result in the total SUs capacity being larger than the total storage system capacity. The first scenario is a decrease in the expected deduplication ratio, where some SUs have consumed storage causing them to overflow their updated capacity, and the second scenario is where the consumed storage of SUs is allowed to be larger than their capacity.

For storage systems where the total SUs capacity can not be larger than the total storage system capacity, the SUs capacity is computed using the following method. For SUs whose consumed size exceeds their proportional capacity, which is computed as the system storage capacity multiplied by their assigned proportion, their capacity is computed according to [E5], namely their capacity is set to be equal to their consumed size. Throughout the following description, the type of these SUs is denoted as exceeding SUs. For all other SUs, whose type is denoted as non-exceeding SUs, their capacity is computed using the following formulae:

$SU$ capacity=(System storage capacity−total capacity of the exceeding $SUs$)×SU updated proportion. [E6]

$SU$ updated proportion=$SU$ assigned proportion/total sum of proportions of the non-exceeding SUs. [E7]

Note that the above computation is iterative. The reason is that when the storage system capacity is reduced, e.g. due to a reduction in the expected deduplication ratio, SUs which are initially part of the non exceeding set, may become part of the exceeding set when applying their updated (and reduced) capacity. Therefore, the above computation is iterated until all SUs whose capacity was reduced in the current iteration (i.e. all SUs which were classified as non exceeded) remain in the non-exceeding set.

Figure 2:
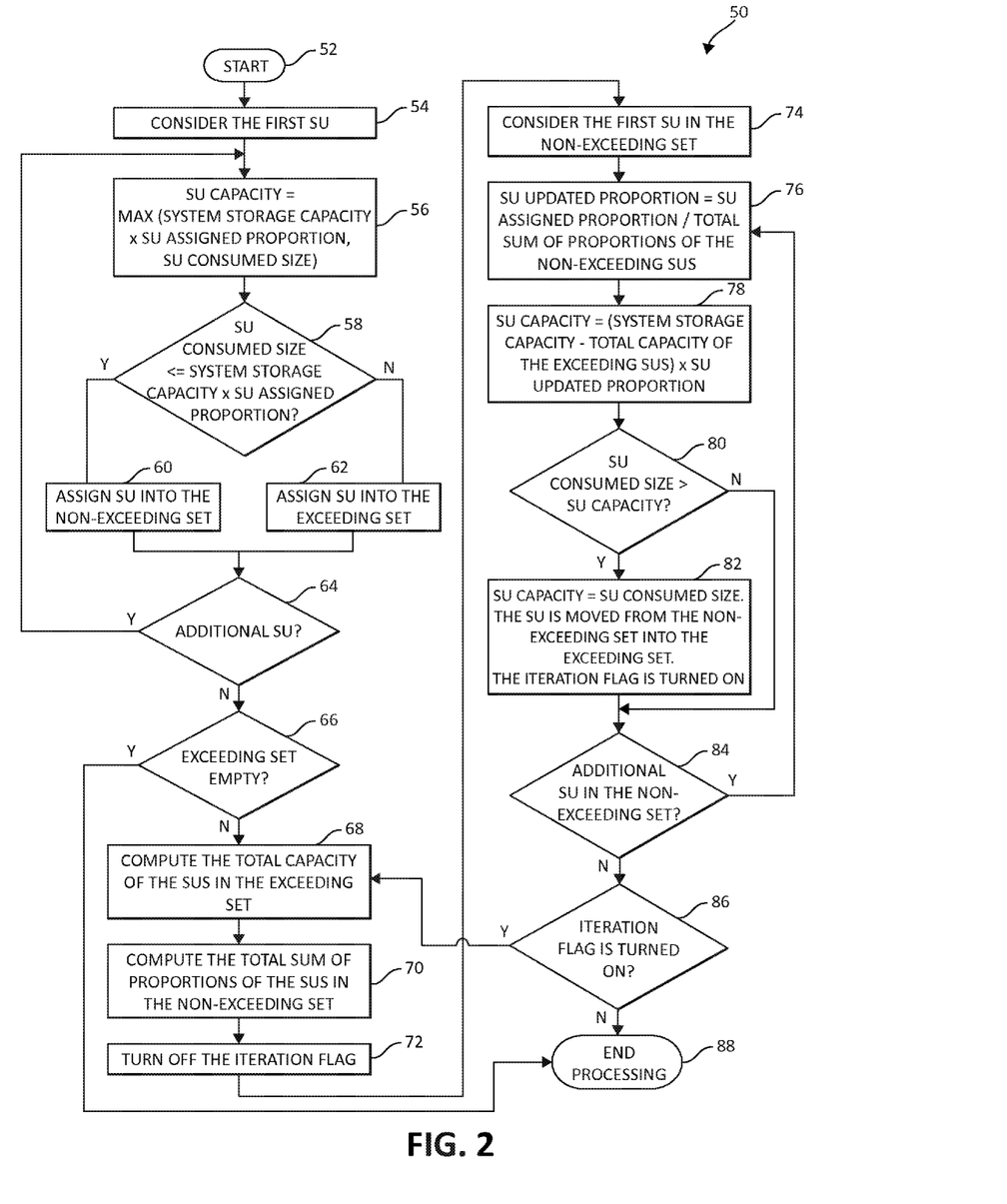
FIG. 2 illustrates an exemplary method for capacity management in a deduplication storage system of a computing environment.

Turning now to FIG. 2, a flow chart illustration of an exemplary method 50 for computing various capacities of the SUs in a deduplication storage system is depicted. In one embodiment, method 50 may be implemented using deduplication system 30 (FIG. 1) components, or various other processing, networking, and storage components in computing environments. As one skilled in the art will appreciate, various steps in the method 50 may be implemented in differing ways to suit a particular application. In addition, the described method may be implemented by various means, such as hardware, software, firmware, or a combination thereof operational on or otherwise associated with the computing environment. For example, the method 50 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums as has been previously described.

Method 50 begins (step 52), by considering a first SU (step 54). For each SU considered, the SU capacity is set to be the MAX (System storage capacity x SU assigned proportion, SU consumed size) (step 56). If (SU consumed size<=System storage capacity x SU assigned proportion) (step 58) then the SU is assigned into the non-exceeding set (step 60). Else the SU is assigned into the exceeding set (step 62). If an additional SU, which was not yet processed, exists (step 64), the method 50 returns to step 56 for additional calculations.

If the exceeding set is not empty (step 66), the total capacity of the SUs in the exceeding set is computed (step 68), the total sum of proportions of the SUs in the non exceeding set is computed (step 70), and the iteration flag is turned off (step 72).

The first SU in the non-exceeding set is considered (step 74). For each SU in the non exceeding set, the SU updated proportion is computed as equaling the SU assigned proportion/total sum of proportions of the non exceeding SUs (step 76). The SU capacity is computed as equaling (System storage capacity—total capacity of the exceeding SUs)×SU updated proportion (step 78). If (SU consumed size>SU capacity) (step 80) then the SU capacity is set to be the SU consumed size, the SU is moved from the non exceeding set into the exceeding set, and the iteration flag is turned on (step 82). If an additional SU in the non-exceeding set, which was not yet processed, exists (step 84), the method returns to step 76 for additional processing as shown. Turning to step 86, if the iteration flag is turned on, then the method 50 iterates back to step 68 as shown. Otherwise, the method 50 then ends (step 88).

Figure 3:
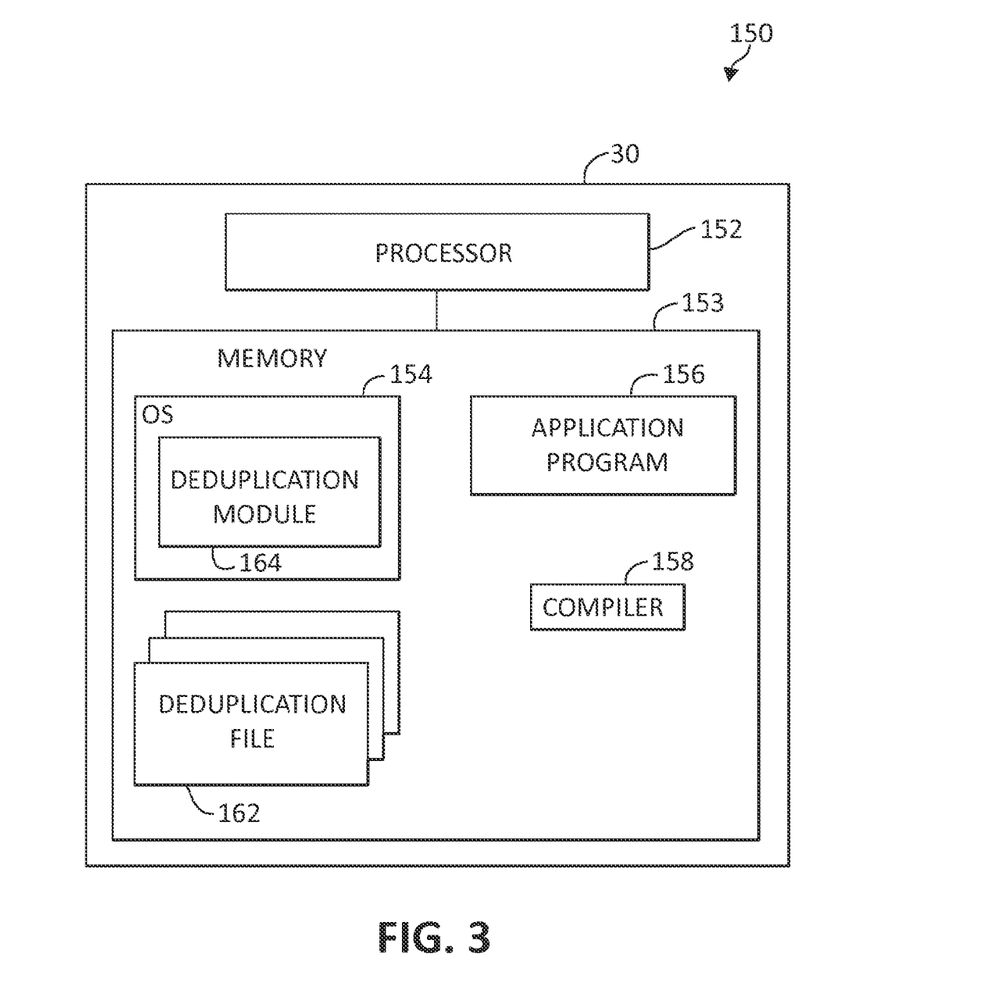
FIG. 3 illustrates an exemplary portion of a deduplication system as illustrated in FIG. 1, previously, including a processor device.

Turning now to FIG. 3, an exemplary portion 150 of a deduplication system 30 as also seen in FIG. 1, previously, is illustrated. Portion 150 of deduplication 30 is operable in a computer environment as a portion thereof, in which mechanisms of the following illustrated embodiments may be implemented. It should be appreciated, however, that FIG. 3 is only exemplary and is not intended to state or imply any limitation as to the particular architectures in which the exemplary aspects of the various embodiments may be implemented. Many modifications to the architecture depicted in FIG. 3 may be made without departing from the scope and spirit of the following description and claimed subject matter.

Deduplication system 30 includes a processor 152 and a memory 153, such as random access memory (RAM). The deduplication system 30 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the deduplication system 30.

In the illustrated embodiment, the deduplication system 30 operates under control of an operating system (OS) 154 (e.g. z/OS, OS/2, LINUX, UNIX, WINDOWS, MAC OS) stored in the memory 153, and interfaces with the user to accept inputs and commands and to present results. In one embodiment of the present invention, the OS 154 facilitates capacity management mechanisms according to the present invention. To this end, OS 154 includes a deduplication module 164 which may be adapted for carrying out various processes and mechanisms in the exemplary method described previously.

The deduplication system 30 may implement a compiler 158 that allows an application program 156 written in a programming language such as COBOL, PL/1, C, C++, JAVA, ADA, BASIC, VISUAL BASIC or any other programming language to be translated into code that is readable by the processor 152. After completion, the application program 156 accesses and manipulates data stored in the memory 153 of the system 30 using the relationships and logic that was generated using the compiler 158.

To further implement and execute mechanisms and processes according to the present invention, OS 154, in conjunction with memory 153, processor 152, application program 56, and other computer processing, networking, and storage components, may implement and/or maintain deduplication files 162. As the skilled artisan will appreciate, the mechanisms of deduplication files 162 as presently illustrated may be implemented in various forms and architectures. Accordingly, the illustration of deduplication files 162 in the present figure is again intended to demonstrate logical relationships between possible computing components in the deduplication system 30, and not to imply a specific physical structure or relationship.

In one embodiment, instructions implementing the operating system 154, the application program 156, and the 158, as well as the deduplication files 162 and the dynamic metadata files 160 are tangibly embodied in a computer-readable medium, which may include one or more fixed or removable data storage devices, such as a zip drive, disk, hard drive, DVD/CD-ROM, digital tape, SSDs, etc. Further, the operating system 154 and the application program 156 comprise instructions which, when read and executed by the system 30, cause the system 30 to perform the steps necessary to implement and/or use the present invention. Application program 156 and/or operating system 154 instructions may also be tangibly embodied in the memory 53 and/or transmitted through or accessed by network 20 via various components (e.g., router 32, FIG. 1). As such, the terms "article of manufacture," "program storage device" and "computer program product" as may be used herein are intended to encompass a computer program accessible and/or operable from any computer readable device or media.

Embodiments of the present invention may include one or more associated software application programs 156 that include, for example, functions for managing a distributed computer system comprising a network of computing devices, such as a storage area network (SAN). Accordingly, processor 152 may comprise one or more storage management processors (SMP). The application program 156 may operate within a single computer and/or deduplication system 30 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for capacity management in a deduplication computing storage environment by a processor device, comprising:
estimating a deduplication storage capacity as a function of an expected deduplication ratio, the expected deduplication ratio being an aggregation of a current deduplication ratio and a configured deduplication ratio, the current deduplication ratio depending on data currently stored in deduplication storage, and the configured deduplication ratio being an estimate made at a configuration stage of the deduplication computing storage environment;
wherein estimating the deduplication storage capacity includes estimating $S_{capacity}$ as a function of $P_{capacity}$, $P_{consumed}$, $R_{expected}$, and $D_{nominal}$, where $S_{capacity}$ is the deduplication storage capacity, $P_{capacity}$ is a physical storage capacity of the deduplication storage environment, $P_{consumed}$ is an amount of physical storage consumed in the deduplication storage environment, $R_{expected}$ is the expected deduplication ratio, and $D_{nominal}$ is a nominal size of data currently stored in the deduplication storage environment.

2. The method of claim 1, further including calculating the expected deduplication ratio as a function of Wc, Rconfigured, WR, and Rcurrent, where Wc and WR are predefined weights dependent on a system maturity, Rconfigured is the configured deduplication ratio, and Rcurrent is the current deduplication ratio.

3. The method of claim 2, further including calculating the current deduplication ratio as a function of $D_{nominal}$, and $P_{consumed}$, where $D_{nominal}$ is the nominal size of data currently stored in the deduplication storage environment, and $P_{consumed}$ is the amount of physical storage consumed in the deduplication storage environment.

4. The method of claim 1, further including calculating a consumed size of a deduplication storage environment as a difference between a nominal size of data streamed into the deduplication storage and a size of data deleted from the deduplication storage.

5. The method of claim 1, further including partitioning the deduplication storage capacity into a plurality of storage units (SUs), each of the plurality of SUs being a logical unit, and all SUs sharing a physical storage.

6. The method of claim 5, wherein a selected one of the plurality of SUs is assigned with a proportion of the deduplication storage capacity, the total proportions of the plurality of SUs one of equal, lower, and higher than 100%.

7. The method of claim 6, further including, if for the one of the plurality of SUs a consumed size exceeds a proportional capacity of the deduplication storage capacity, calculating a capacity as a function of $S_{capacity}$, $SU_{assigned}$, and $SU_{consumed}$, where $S_{capacity}$ is the deduplication storage capacity, $SU_{assigned}$ is an assigned storage proportion for the one SU, and $SU_{consumed}$ is a difference between a nominal size of data streamed into the one SU and a data size deleted from the one SU.

8. The method of claim 7, further including, if the consumed size does not exceed the proportional capacity, calculating the capacity as a function of $S_{capacity}$, $T_{capacity}$, and $SU_{updated}$, where $S_{capacity}$ is the deduplication storage capacity, $T_{capacity}$ is a total capacity of all exceeding SU of the plurality of SUs, and $SU_{updated}$ is an updated proportion defined by $SU_{assigned}$, and $S_{non-exceeding}$, where $SU_{assigned}$ is the assigned storage proportion for the one SU and $S_{non-exceeding}$ is a total sum of proportions of all non-exceeding SU of the plurality of SUs.

* * * * *